United States Patent [19]

Deyoe et al.

[11] 3,988,483

[45] Oct. 26, 1976

[54] LIQUID STARCH-UREA RUMINANT FEED AND METHOD OF PRODUCING SAME

[75] Inventors: Charles W. Deyoe; Erle E. Bartley, both of Manhattan, Kans.

[73] Assignee: The Kansas State University Research Foundation, Manhattan, Kans.

[22] Filed: Sept. 4, 1975

[21] Appl. No.: 610,160

[52] U.S. Cl. .................................. 426/53; 426/69; 426/335; 426/532; 426/583; 426/600; 426/623; 426/635; 426/636; 426/637; 426/658; 426/661; 426/476; 426/807
[51] Int. Cl.² ....................... A23K 1/00; A23K 1/22
[58] Field of Search ............. 426/69, 583, 618, 623, 426/630, 635, 636, 637, 661, 476, 807, 53, 335, 532, 600, 658

[56] References Cited
UNITED STATES PATENTS

| | | | |
|---|---|---|---|
| 3,642,489 | 2/1972 | Bartley et al. | 426/69 |
| 3,940,493 | 2/1976 | Fox | 426/807 X |

Primary Examiner—A. Louis Monacell
Assistant Examiner—R. A. Yoncoskie
Attorney, Agent, or Firm—Schmidt, Johnson, Hovey & Williams

[57] ABSTRACT

A low-cost, highly nutritious starch-NPN liquid feed supplement and method of producing same is provided wherein the supplement exhibits markedly superior protein synthesis and growth-inducing properties as compared with conventional, unprocessed NPN-fortified supplements notwithstanding the fact that the supplements hereof generally have lower theoretical nutritive values than such prior feeds. The preparative method preferably includes the steps of passing an aqueous slurry of a starch-bearing food source and an NPN substance such as urea through a hydrothermal-type cooker along with direct steam for turbulently heating, disrupting and gelatinizing the starch source in the presence of the NPN substance to thereby yield a reacted product which can be fed to ruminants as a low-cost, high-protein food source. A wide variety of NPN substances can be employed in the supplements hereof, along with a large number of starch sources such as grains or industrial wastes such as starch-bearing food and beverage processing waste liquors. In addition, the liquid supplements hereof can be modified either before or after processing by adding energy sources such as molasses thereto.

45 Claims, 2 Drawing Figures

LIQUID STARCH-UREA RUMINANT FEED AND METHOD OF PRODUCING SAME

This invention relates to liquid ruminant feed supplements of the type including a starch-bearing food source and a nonprotein nitrogen (NPN) substance which can be effectively utilized by a ruminant for the production of microbial protein. More particularly, it is concerned with such products and a method of producing the same wherein the supplements have highly unexpected and synergistic protein synthesis and growth-inducing properties and are palatable and producible by low-cost methods such as with a hydrothermal cooker using direct steam, as opposed to an expensive extrusion cooking system or the like conventionally used in making reacted chunk-type starch-NPN products.

It is known that nonprotein nitrogenous substances such as urea may be incorporated into feed for ruminants as a replacement for protein sources therein. Such added urea or other NPN source is first degraded by rumen microorganisms to ammonia and a portion of the latter is then converted to microbial protein. A major portion of such microbial protein is then enzymatically degraded to amino acids in the small intestine of the ruminant, where, after being absorbed, they are available for use by the animal. As will be readily apparent, NPN supplementation of ruminant feed is extremely attractive from an economic standpoint, since relatively inexpensive materials such as urea can be fed in place of costlier natural proteins coming from traditional sources such as cereal grains or the like.

In the past, attempts have been made to incorporate NPN substances into chunk-type products which are fed directly as a primary food source to ruminants, or in liquid feed supplements which are fed as liquids or sprayed onto more conventional feeds such as silage or hay. In the case of solid products it is known that extrusion processing of a starch-bearing food source such as corn and an NPN substance such as urea yields a reacted product which permits incorporation of the NPN substance at levels which would be toxic if simply mixed with the starch source and fed directly. See, for example, U.S. Pat. No. 3,642,489.

It is also known to prepare sprayable liquid feed supplements which include a minor amount of a starch source such as wheat or corn in conjunction with urea. For example, in U.S. Pat. No. 3,684,518, a method is disclosed wherein an aqueous slurry of wheat flour and urea liquor is prepared and simply heated at atmospheric pressure in order to provide a liquid product which is resistant to sedimentation. In addition, in U.S. Pat. No. 3,653,909 a method is described wherein melamine and urea are admixed in aqueous suspension with wheat flour and heated under atmospheric pressure to achieve a uniform consistency. Other conventional feed supplements are described in the following U.S. Pat. Nos. 2,748,001; 2,853,385; 2,960,406; 3,165,413; 3,573,924 and 3,677,767.

Although NPN fortification of chunk-type and liquid feed supplements is well-known, a number of unresolved problems remain. For example, in the case of chunk-type starch-NPN products produced in accordance with U.S. Pat. No. 3,642,489, the cost of the necessary extrusion equipment is considerable, and this factor alone has in some cases militated against the widespread use of this otherwise advantageous chunk product. On the other hand, merely admixing a raw starch source and NPN substance in aqueous suspension is not a satisfactory answer because such mixtures often exhibit a number of undesirable characteristics. For example, when the NPN substance is added at commercially feasible levels, it often happens that the simple mixture is toxic to the ruminant. Aside from this, simple unprocessed mixtures of this type can also be unpalatable to ruminants or lead to inefficient use of the NPN substance by the animal being fed.

The most important object of the present invention is to provide liquid starch-NPN ruminant feed supplements which are characterized by enhanced protein synthesis and growth-inducing properties as compared with conventional, substantially unprocessed and uncooked feed supplement mixtures containing an NPN substance, and which are also markedly superior to chunk-type starch-NPN feeds processed using extrusion cooking techniques.

Another important object of the invention is to provide high-protein, low-cost liquid starch-NPN feed supplements for ruminants which can be processed using simplified techniques and relatively inexpensive equipment and are palatable and highly nutritious to the ruminant.

As a corollary to the foregoing, another object of the invention is to provide a method of quickly, easily and inexpensively processing an aqueous slurry of a starch-bearing food source and an NPN substance wherein respective streams of pressurized steam and the starch-NPN slurry are simultaneously and continuously directed through a cooking area presenting a zone of turbulence for substantially instantaneously and turbulently heating, disrupting and gelatinizing under pressure above atmospheric at least a fraction of the starch-bearing food source while the latter is in intimate relationship with the NPN substance to thereby yield a reacted feed supplement product; this cooking is preferably accomplished in a hydrothermal cooker which serves to quickly and inexpensively produce the liquid supplements hereof which have been found to yield highly unexpected results in terms of derivable microbial protein levels and growth-inducing properties in ruminants.

A still further object of the invention is to provide a liquid feed supplement of the type described wherein the specific handling properties thereof can be modified at will by the addition of viscosity altering enzymes or supplemental food sources such as molasses.

Figure 1:
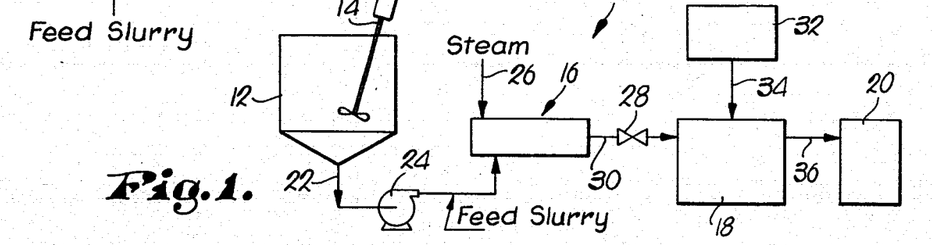
FIG. 1 is a schematic representation of the overall processing equipment advantageously used in the preparation of the liquid feed supplements hereof.

FIG. 1 is a schematic illustration of the preferred apparatus 10 for use in preparing the liquid feed supplements of the invention. Briefly, apparatus 10 includes a slurry tank 12 having a mixer 14 therein, a hydrothermal heater or "jet cooker" 16, an intermediate hold tank 18 and a final product tank 20. A slurry line 22 extends between tank 12 and jet cooker 16, and has a positive displacement pump 24 interposed therein for pumping the slurry to cooker 16. The latter includes a steam line 26 which is important for purposes to be made clear hereinafter, along with a back pressure valve 28 interposed within the product recovery line 30 extending between cooker 16 and intermediate hold tank 18. An additive tank 32 is also provided in apparatus 10 with a line 34 extending between tanks 32 and 18. Although only a single tank 32 is shown in FIG. 1, it is to be understood that a series of such tanks may be provided for holding quantities of additives such as molasses or phosphoric acid which may optionally be added to the supplements when they are within intermediate tank 18. Finally, a line 36 extends between tanks 18 and 20 for the purpose of conveying the final commercial product to tank 20 prior to packaging or subsequent handling thereof.

Figure 2:
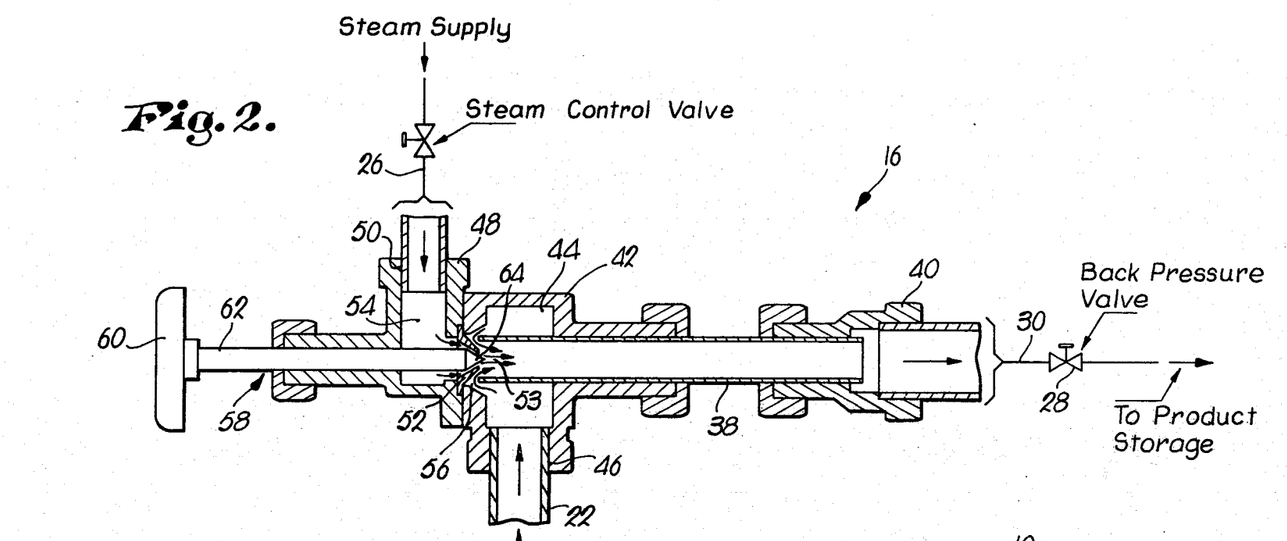
FIG. 2 is an essentially schematic view in vertical section of one type of hydrothermal cooker which may be used in the process of the present invention.

Referring now to FIG. 2, preferred cooker 16 will be described in greater detail. In particular, cooker 16 includes an elongated tubular cooking area or barrel 38 which is coupled at the delivery end thereof to line 30 by means of conventional coupling structure 40, and is received at the other end thereof within a head 42 of the cooker. Head 42 is a metallic member presenting an annular hollow area 44 about the adjacent end of barrel 38 and a port 46 which is adapted to receive the end of feed slurry line 22 as shown.

A steam inlet head 48 is secured adjacent to head structure 42 and includes a port 50 which is adapted to receive the end of incoming steam line 26. In addition, head 48 includes an open-ended, generally frustoconical steam outlet collar 52 which communicates the interior of barrel 38 with the hollow interior 54 of steam head 48. In this respect, it is important to note than an annular throat or passageway 56 is provided between the end of barrel 38 and the adjacent exterior sloping side wall of collar 52.

A threadedly mounted needle valve 58 is also provided in head 48 and includes an external handle 60 connected to an elongated shaft 62 which extends through the end of head 48 remote from steam outlet 52. Shaft 62 terminates in a conical end 64 which is complementally configured with respect to the internal side walls of outlet 52. As will be appreciated from a study of FIG. 2, handle 60 can be rotated for advancing or retracting conical section 64 in order to precisely meter the amount of steam allowed to pass through the restricted opening of collar 52 and into barrel 38.

In use, raw feed slurry is conveyed through line 22 and enters annular space 44 and passes through throat 56 into barrel 38. At the same time, steam through line 26 passes through space 54 and between the adjacent surfaces of conical section 64 and collar 52 so that the respective streams of slurry and steam come into direct intersecting contact adjacent the restricted end of the collar. As illustrated in the drawing, the steam stream passes into barrel 38 in a generally axial direction while the slurry stream is directed obliquely through throat 56 but in the same general axial direction as the stream of steam in order to assure adequate intersecting contact and intermingling of the two streams. Thus, the area 53 immediately in front of the restricted end of collar 52 in effect is a zone of turbulence wherein the feed slurry and steam streams turbulently intersect for substantially instantaneously cooking the starch-bearing material within the slurry stream. Such cooking involves the turbulent heating, disrupting and gelatinization of the starch material in the presence of the NPN substance within the slurry stream under pressures above atmospheric in order to yield a reacted liquid supplement product. As will be demonstrated hereinafter, this type of turbulent cooking is important in producing the supplements of the invention, as opposed to merely heating the constituents together under atmospheric pressures. Furthermore, the resultant products from the turbulent cooking are believed to act as nutritional sources in a very different manner than, for example, prior extrusion-processed chunk starch-NPN products.

Following turbulent cooking with direct steam, the product passes through barrel 38 and out the end thereof into line 30 and ultimately into intermediate holding tank 18. At this point mixing of the supplement with molasses or other energy sources can be accomplished, along with viscosity reduction through the use of an enzyme such as an amylase or the like, whereupon the finished product can pass to final tank 20.

As indicated above, the first step in the preferred method of the invention involves preparing an aqueous slurry comprising water and a solids fraction which includes a quantity of an edible, substantially ungelatinized starch-bearing feed material and an amount of a nonprotein nitrogenous substance such as urea or the like which is characterized by the property of being hydrolyzable to ammonia by rumen microorganisms which is thereafter convertible to microbial protein. In practice, the slurry advantageously comprises from about 30 to 90 percent by weight free water (i.e., without taking into consideration the native water within the raw feed constituents), and correspondingly a solids fraction of from about 10 to 70 percent by weight. Most preferably, the slurry is from about 40 to 70 percent by weight free water, and from about 30 to 60 percent by weight solids.

An almost limitless number of starch-bearing materials can be employed to good effect in the present invention. For example, food sources selected from the group consisting of corn, sorghum, barley, oats, wheat, rice, millet, hay, silage, potatoes, yams, cassava, arrowroot, turnips, rutabagas, corn starch, potato starch, wheat starch, starch-bearing food and beverage processing waste liquors, and mixtures thereof have particular utility in the invention, although other specific starch sources may also be used. In addition, when grains such as corn or the like are used as the starch source, the same are preferably ground or micropulverized to an average particle size of less than about 500 microns, and preferably to an average size from about 75 to 100 microns. This comminution of the starch material is preferable in order that water and/or steam can be brought into intimate contacting relationship with the starch-bearing material to facilitate gelatinization thereof in the presence of the NPN substance.

A wide variety of NPN substances can also be employed in the present invention as long as the NPN source is characterized by the property of being hydrolyzable to ammonia by rumen microorganisms so that such ammonia can thereafter be converted to microbial protein by the ruminant. For example, NPN sources such as urea, uric acid, biuret, ethylene urea, ammonia, ammonium salts, propionamide, butyramide, formamide, acetamide, dicyanodiamide, isobutanediurea, creatinine, and creatine and mixtures thereof find particular utility in the invention. Specific ammonium salts advantageously used include members taken from the group consisting of ammonium phosphate, ammonium carbonate, ammonium bicarbonate, ammonium carbamate, ammonium citrate, ammonium formate, ammonium acetate, ammonium propionate, ammonium lactate, ammonium succinate, ammonium fumarate, ammonium malate, ammonium chloride, ammonium sulfate, diammonium phosphate and mixtures thereof. Urea is the most preferred NPN source, however, because of its relatively low cost and high nitrogen content.

In general, the amount of NPN substance used in the present supplements will exceed to a greater or lesser degree the amount which could be tolerated by ruminants as to toxicity and palatability if simply mixed with a starch source and fed directly. It has been found that a ratio of starch source to nitrogen from the NPN substance is advantageously maintained within the range of from about 4:0.45 to 1:1.80, with the most preferred starch source-NPN nitrogen ratio ranging from about 2:0.45 to 1:0.90.

is completely unmanageable in use, then the processed product has no significant utility as a ruminant feed. In the latter connection, it has been found that in the use of urea as an NPN substance, the starch/NPN ratio preferably ranges from about 4:1 to 1:4, and most preferably from about 2:1 to 1:2. Since urea is approximately 45 percent by weight nitrogen, the preferrred starch source/NPN nitrogen ratios range from about 4:0.45 to 1:1.80, and most preferably from about 2:0.45 to 1:0.90. The following Table I sets forth the amount of each of the preferred NPN substances needed to yield supplements having the broad starch source/NPN nitrogen ratios stated above:

TABLE I

| NPN Compound | % N | [1]% by Wt to Yield 4:0.45 | 1:1.80 | [2]P.E. at 4:0.45 | [2]P.E. at 1:1.80 |
|---|---|---|---|---|---|
| Urea | 45.00 | 20.0 | 80.0 | 63.4 | 226.8 |
| Biuret | 40.77 | 21.6 | 81.5 | 62.1 | 209.4 |
| Ethylene Urea | 32.54 | 25.7 | 84.7 | 59.0 | 173.6 |
| Ammonia | 82.25 | 12.1 | 68.6 | 70.1 | 355.4 |
| Ammonium Phosphate | 12.17 | 48.0 | 93.7 | 41.2 | 71.8 |
| Ammonium Bicarbonate | 17.72 | 38.8 | 91.0 | 48.5 | 101.6 |
| Ammonium Chloride | 26.18 | 30.1 | 87.3 | 55.5 | 143.9 |
| Ammonium Sulfate | 21.20 | 34.7 | 89.5 | 51.9 | 119.5 |
| Ammonium Carbonate | 26.35 | 29.9 | 87.2 | 55.6 | 144.8 |
| Ammonium Carbamate | 35.89 | 23.9 | 83.4 | 60.5 | 188.6 |
| Ammonium Citrate | 12.39 | 47.6 | 93.6 | 41.6 | 73.1 |
| Ammonium Formate | 22.21 | 33.6 | 89.0 | 52.6 | 124.5 |
| Ammonium Acetate | 18.17 | 38.2 | 90.8 | 49.3 | 103.9 |
| Ammonium Propionate | 19.17 | 37.0 | 90.4 | 50.0 | 109.2 |
| Ammonium Lactate | 13.08 | 46.2 | 93.2 | 42.6 | 76.8 |
| Ammonium Succinate | 18.41 | 37.9 | 90.7 | 49.2 | 105.2 |
| Ammonium Fumarate | 18.58 | 37.7 | 90.6 | 49.4 | 106.0 |
| Ammonium Malate | 16.66 | 40.3 | 91.5 | 47.3 | 96.0 |
| Diammonium Phosphate | 21.21 | 34.7 | 89.5 | 51.9 | 119.6 |
| Propionamide | 19.17 | 37.0 | 90.4 | 50.0 | 109.2 |
| Butyramide | 16.08 | 41.2 | 91.8 | 46.7 | 93.0 |
| Formamide | 31.10 | 26.6 | 85.3 | 58.3 | 167.1 |
| Acetamide | 23.72 | 32.2 | 88.4 | 53.8 | 132.1 |
| Creatinine | 37.15 | 23.2 | 82.9 | 60.8 | 194.0 |
| Creatine | 32.05 | 25.98 | 84.9 | 58.7 | 171.4 |
| Uric Acid | 33.33 | 25.2 | 84.4 | 59.2 | 177.2 |
| Dicyanodiamide | 66.64 | 14.4 | 73.0 | 67.7 | 306.5 |
| Isobutanediurea | 32.18 | 25.9 | 84.8 | 58.8 | 171.9 |

[1]% by weight of the NPN substance to give the desired starch source/NPN nitrogen ratio.
[2]Protein Equivalent on dry basis of mixtures having the respective starch source/NPN nitrogen ratios.

During cooking operations, sufficient quantities of steam are fed to cooker 16 in order to maintain cooking temperature therewithin the range of from about 215° F. to 388° F., and most preferably from about 285° F. to 315° F. This corresponds to a pressure within the jet cooker of from about 1 to 200 p.s.i.g., and preferably from about 38 to 70 p.s.i.g. In addition, sufficient moisture and thermal conditions are maintained during the cooking operation such that the starch-bearing food source passing through the cooker is from about 50 to 100 percent gelatinized, and most preferably from about 90 to 100 percent gelatinized.

Although the ratio of NPN to starch-bearing material may be varied as dictated by price consideration, availability of constituents, processing requirements, and ultimate end use parameters, the proportions are advantageously maintained within certain limits not only from the standpoint of operability but also commercial feasibility. For example, unless sufficient NPN is provided in the initial mixture to warrant inclusion thereof from an economic as well as a nutritional standpoint, the cost of processing the constituents may outweight the benefits. On the other hand, if the quantity of NPN present in the admixture is increased to a level where the final product is unpalatable even in a processed condition because of excess NPN and the composition The protein equivalent levels given in Table I for the respective mixtures indicate that this parameter can be varied over a wide range. In preferred forms the supplements hereof have P.E. levels of from about 15 to 150 percent and most preferably from about 30 to 70 percent, however.

During passage of the feed slurry through the cooking area and zone of turbulence presented by cooker 16, it will be appreciated that an amount of water in the form of condensed steam is picked up. In this connection it has been found that the feed product emerging from the jet cooker preferably should comprise from about 40 to 96 percent by weight water, and most preferably from about 40 to 70 percent by weight water. The water fraction for a given supplement may principally depend upon the type of starch source used; for example, with potato starch, it is generally found that higher solids contents are possible than with wheat or corn.

As indicated above, the produce emerging from cooker 16 may be altered as to energy content and viscosity by a number of means. For example, a food source selected from the group consisting of molasses, hemicellulose extract of wood, lignin sulfonates, cheese whey, food and beverage processing waste liquors and mixtures thereof can be added to the feed product either prior to or subsequent to the jet cooking processing in order to enhance the total digestible nutrient (TDN) value thereof. Also, in some instances it is advantageous to add to the final feed product an acid taken from the group consisting of sulfuric, hydrochloric, phosphoric, propionic, acetic, sorbic, benzoic, butyric and formic acids and mixtures thereof. Propionic, acetic butyric, sorbic and formic acids may serve principally as mold inhibitors for increasing the storability of the liquid supplement products, while the remaining aforementioned acids can be added as pH regulators and also as nutritive substances.

In preferred forms, the final feed product in commercial form has a viscosity within the range of from about 100 to 20,000 centipoises (cps). This viscosity alteration can be effected in a number of ways. For instance, in commercial forms molasses is added to the feed product after emergence thereof from the cooking variables (cooking temperature, grain-urea ratio, and percentage solids) being changed in order to determine the effect of these variables on the final feed products.

In more detail, each of the twenty liquid products were processed in a jet cooker of the type illustrated in FIG. 2, and the cooking temperatures therein were varied within the range of from about 250° to 320° F. The corn used as the starch-bearing food source was micropulverized to an average particle size of about 100 microns. The corn/urea ratios studied ranged from about 2.6:1 to 1:2.6. The solids content before cooking ranged from about 14% to 46% by weight.

The determinations made on the twenty samples included protein equivalent (Kjeldahl N × 6.25), maltose value and in vitro protein synthesis. The supplement makeup and results of this series of tests are tabulated below:

TABLE II

| Sample No. | [1]Corn (g) | Urea (g) | Water (ml) | Corn/Urea | Cook (° F) Temperature | [2]P.E. (Determined) | [3]Mg Maltose/ g Sample | [4]Protein Synthesis (%) |
|---|---|---|---|---|---|---|---|---|
| 1 | 533.3 | 266.7 | 2,880 | 2:1 | 263 | 16.32 | 339 | 154 |
| 2 | 533.3 | 266.7 | 2,880 | 2:1 | 307 | 17.03 | 339 | 125 |
| 3 | 266.7 | 533.3 | 3,040 | 1:2 | 263 | 30.87 | 312 | 118 |
| 4 | 266.7 | 533.3 | 3,040 | 1:2 | 307 | 30.21 | 312 | 118 |
| 5 | 533.3 | 266.7 | 1,040 | 2:1 | 263 | 36.05 | 285 | 147 |
| 6 | 533.3 | 266.7 | 1,040 | 2:1 | 307 | 36.38 | 285 | 164 |
| 7 | 266.7 | 533.3 | 1,120 | 1:2 | 263 | 65.21 | 278 | 111 |
| 8 | 266.7 | 533.3 | 1,120 | 1:2 | 307 | 65.27 | 267 | 116 |
| 9 | 400.0 | 400.0 | 1,707 | 1:1 | 250 | 37.04 | 276 | 117 |
| 10 | 400.0 | 400.0 | 1,707 | 1:1 | 320 | 38.09 | 264 | 121 |
| 11 | 577.8 | 222.2 | 1,637 | 2.6:1 | 285 | 23.04 | 226 | 135 |
| 12 | 222.2 | 577.8 | 1,777 | 1:2.6 | 285 | 52.64 | 295 | 116 |
| 13 | 400.0 | 400.0 | 4,571 | 1:1 | 285 | 17.69 | 351 | 150 |
| 14 | 400.0 | 400.0 | 835 | 1:1 | 285 | 56.45 | 252 | 112 |
| 15 | 400.0 | 400.0 | 1,707 | 1:1 | 285 | 36.60 | 288 | 137 |
| 16 | 400.0 | 400.0 | 1,707 | 1:1 | 285 | 37.59 | 285 | 137 |
| 17 | 400.0 | 400.0 | 1,707 | 1:1 | 285 | 38.59 | 288 | 122 |
| 18 | 400.0 | 400.0 | 1,707 | 1:1 | 285 | 39.03 | 288 | 131 |
| 19 | 400.0 | 400.0 | 1,707 | 1:1 | 285 | 38.59 | 285 | 134 |
| 20 | 400.0 | 400.0 | 1,707 | 1:1 | 285 | 38.37 | 292 | 131 |

[1]The corn was ground to an average particle size of approximately 100 microns prior to processing.
[2]Determined by the Kjeldahl method (Kjeldahl N × 6.25).
[3]Maltose value adjusted to grain dry matter is an indication of the degree of cook, with higher values representing greater cooking.
[4]These values are expressed in terms of percent of control, with the control for each supplement consisting of the determined protein synthesis of an unprocessed admixture containing the same amount of urea and raw corn as the respective supplements.

barrel, whereupon the molasses-supplement mixture is directed to a holding tank for cooling therein to a temperature of under about 185° F. At this point a minor amount of amylase enzyme is added to the mixture within the holding zone for lowering the viscosity thereof. The amylase is allowed to act for a period of time to lower the viscosity of the supplement to a desired level, whereupon a small amount of acid such as phosphoric acid is added to the mixture in order to stop the action by the amylase.

The final liquid feed supplement products are storable at room temperatures for relatively long periods of time, i.e., two months or more. Accordingly, few, if any, special precautions need be taken during storage.

The following examples will illustrate the production of liquid supplements in accordance with the invention and also test procedures involving the same. However, it is to be understood that the following examples are for purposes of illustration only and should not be taken as limitations upon the scope of the invention. In all cases the term "liquid supplement" refers to products produced in accordance with the methods of the present invention.

EXAMPLE I

A series of twenty liquid feed supplements in accordance with the invention were prepared, with three A study of the above table will demonstrate that a wide variety of processing conditions and food source-NPN ratios can be employed in the present invention. For example, the recorded cook temperatures within the jet cooker ranged from about 263° F. to 320° F., and this variation did not appreciably lower the protein synthesis values determined for the respective products.

The maltose values recorded in Table II are a measure of the extent of cooking and gelatinization of the corn. These values are adjusted to grain dry matter and reflect the number of milligrams of maltose per gram of dry matter. Theoretically, a maltose value of approximately 240 represents complete cooking and gelatinization. Thus, it will be clear that all of the prepared feed products were essentially completely cooked and gelatinized.

The protein synthesis figures given above were derived from conventional in vitro tests wherein samples of the control (identical quantities of raw corn and urea in an unprocessed state) and test feed products were placed in identical quantities of rumen fluid and allowed to ferment for equal periods of time. The total protein levels derived from each fermentation were then measured and corrected for the percentage of nitrogen present in each sample. The synthesis levels of the twenty test samples are expressed in terms of percent of control, wherein each control consists of equal amounts of raw constituents which are simply admixed and tested without processing. A review of these results will confirm that in each case an enhanced protein synthesis was observed for the processed product (since all values are above 100%), as compared with the raw constituents thereof.

The pH of all of the above samples was on the alkaline side of neutrality and ranged between 8.1 and 8.9. In addition, samples of each run were stored at room temperature for a period of 40 days to test their storage quality. Corresponding samples of the respective runs were also stored for a similar period at 4° C. All of the samples stored at room temperature looked and smelled like the refrigerated samples, and accordingly it was concluded that for reasonable storage periods, no special handling techniques were needed.

Three feed supplements (Nos. 16, 17 and 18) were treated with α-amylase in order to lower the viscosity thereof. The initial viscosity of the samples was first determined using a Brookfield LVT viscometer at the lowest RPM and highest RPM of the instrument and at 23° C. Minor amounts of α-amylase (0.04% and 0.20% by weight) were added to respective samples of the feed products and allowed to digest for a period of 72 hours. Readings were taken at 24, 48 and 72 hours respectively at 43° C., with a final reading at 72 hours at 23° C. The results of this test are set forth in the following Table III:

TABLE III

| [2]Sample No. | α-amylase | Initial Viscosity (23° C) | 24 Hrs (43° C) | 48 Hrs (43° C) | 72 Hrs (43° C) | 72 Hrs (23° C) |
|---|---|---|---|---|---|---|
| 16 | 0 | 64,240–178,400 | 6,600–50,000 | 3,500–34,000 | 3,050–22,000 | 7,650–66,800 |
| 16 | 0.04 % | " | 31.5 | 29–95 | 29–75 | 30–75 |
| 16 | 0.20 % | " | 35.0 | 32–88 | 29–80 | 33–80 |
| 17 | 0 | 169,400–280,000 | 700–56,000 | 6,200–33,000 | 6,700–44,000 | 9,600–100,000 |
| 17 | 0.04 % | " | 28.5–87.5 | 26–78 | 25–75 | 38–75 |
| 17 | 0.20 % | " | 39.0–107.5 | 39–100 | 30–95 | 35–100 |
| 18 | 0 | 150,600–230,800 | 7,700–66,000 | 8,000–63,000 | 6,500–44,000 | 15,000–100,000 |
| 18 | 0.04 % | " | 34–100 | 35–88 | 33–80 | 35–100 |
| 18 | 0.20 % | " | 40–100 | 38–110 | 35–113 | 43–125 |

[1]All viscosity readings given in centipoises (cps).
[2]Sample Nos. correspond to those of Table II.

A study of the above table will confirm that viscosity reduction was maximum within the first twenty-four hours and varied very little after this period. In addition, there was essentially no difference between the two levels of enzyme used in reducing the viscosity, and accordingly the smaller amount would be preferred.

In another enzyme treatment test, three additional samples (Nos. 21–23) were prepared. The first sample (No. 21) served as a control, while 0.04% by weight of α-amylase was added to sample No. 22 and 0.20% by weight to sample No. 23. All samples were incubated at 43° C. for 48 hours and then jet cooked in the manner described above at a temperature of about 283° F. The samples were then cooled to 22° C. and Brookfield viscosity determinations were made. These results are reported in Table IV below:

TABLE IV

| Sample No. | α-Amylase | Final Viscosity (cps at 22° C) |
|---|---|---|
| 21 | 0.00 % | 1,030 – 26,000 |
| 22 | 0.04 % | 990 – 22,000 |
| 23 | 0.20 % | 980 – 22,000 |

The results of this test show that the addition of enzyme before jet cooking had little or no effect on viscosity. However, incubation of the samples at 43°C. for 48 hours prior to cooking considerably reduced viscosity since samples with similar compositions which were processed under identical conditions (e.g., Nos. 15–20) had much higher viscosities than the incubated samples.

EXAMPLE II

In this series of tests a number of additives were admixed with several of the liquid supplements of Example I in order to provide blends. In particular, fourteen of the feed supplements produced in Example I were admixed in varying proportions with molasses and the protein synthesis values of the several blends was determined. The results of these tests are set forth in Table V hereunder wherein the protein synthesis values are expressed as percentages of a control comprising a conventional molasses-urea blend having a protein equivalent of about 30% (68.0% molasses, 10.0% urea, 19.0% water, 3.0% phosphoric acid blended together). A review of the protein synthesis data will confirm that in all cases addition of the reacted liquid supplement product served to significantly enhance the amount of protein derivable from the blends.

TABLE V

| Sample No. | % Molasses | [1]Protein Synthesis |
|---|---|---|
| 5 | 14.1 | 127.47 |
| 6 | 22.2 | 133.88 |
| 7 | 54.5 | 147.70 |
| 8 | 54.5 | 132.15 |
| 9 | 16.6 | 123.44 |
| 10 | 21.2 | 121.79 |
| 12 | 42.0 | 126.73 |
| 14 | 48.4 | 121.79 |
| 15 | 16.7 | 137.25 |
| 16 | 18.6 | 125.00 |
| 17 | 20.2 | 130.10 |
| 18 | 19.6 | 136.68 |
| 19 | 20.1 | 125.90 |
| 20 | 17.9 | 136.68 |

[1]Protein synthesis values given as a percent of 30 % P.E. molasses-urea blend control taken as 100 %.

In another series of tests other blend materials (Masonex brand hemicellulose extract of wood sold by the Masonite Corporation of Chicago, Illinois, cheese whey, and beer-making waste liquors) were admixed with the starch-NPN liquid supplements of the present invention, and the protein synthesis values of the respective blends were measured. In each case, the molasses and phosphoric acid were added subsequent to cooking while the other additives (cheese whey, beer-making waste liquor, hemicellulose extract) were admixed with the slurry prior to cooking. The results of this series of tests (yielding samples Nos. 24–31) is recorded in Table VI.

A review of the results contained in Table VI will confirm that in each case substantially equivalent or enhanced protein synthesis results from the processed product in a blend with the various food source materials, as opposed to the unprocessed controls.

It is to be noted in this respect that Table VII lists the total digestible nutrients (TDN) for each of the feed constituents and for the overall supplement. As to the latter, the TDN value is 24.10.

Table VIII below lists the constituents and TDN values for the molasses-urea test supplement. In this case the listed ingredients were simply admixed together

TABLE VI

| Sample No. | % Corn | % Urea | % Water | % Molasses | % Hemicellulose Extract | % Cheese Whey | % Beer Liquor | % Phosphoric Acid | Protein Synthesis |
|---|---|---|---|---|---|---|---|---|---|
| 24 | 23.3 | 11.6 | 47.6 | 17.5 | — | — | — | — | 100.00 |
| 25 | 23.3 | 11.6 | 47.6 | — | [3]17.5 | — | — | — | [1]90.20 |
| 26 | 23.3 | 11.6 | 47.6 | — | [4]17.5 | — | — | — | 109.73 |
| 27 | — | 10.0 | 19.0 | 68.0 | — | — | — | 3.0 | 100.00 |
| 28 | 22.7 | 12.4 | 45.1 | 16.2 | — | — | — | 3.6 | [2]133.00 |
| 29 | 22.9 | 12.5 | 35.2 | 8.2 | — | 17.6 | — | 3.6 | 126.50 |
| 30 | 22.9 | 12.5 | 25.8 | — | — | 35.2 | — | 3.6 | 191.50 |
| 31 | 21.1 | 11.5 | — | 15.1 | — | — | 48.9 | 3.4 | 126.60 |

[1]Protein synthesis values for Nos. 25 and 26 taken as a percent of control (No. 24) which consists of an unprocessed corn-urea-molasses blend.
[2]Protein synthesis values for Nos. 28–31 taken as a percent of control (No. 27) which is an unprocessed urea-molasses blend.
[3]Ukiah Masonex hemicellulose extract sold by the Masonite Corp. of Chicago, Ill.
[4]Laurel Masonex hemicellulose extract sold by the Masonite Corp. of Chicago, Ill.

EXAMPLE III

A growth study was undertaken to determine the comparative growth characteristics using identical feed rations supplemented by a liquid product of the present invention, a chunk-type starch-NPN food source, soybean meal, and a conventional urea-molasses mixture. The experiment was designed with eight lots of cattle containing six animals per lot. Each dietary treatment was fed to a total of twelve animals.

In more detail, protein supplements were sprayed on the daily silage ration, with hay being provided free choice and consumption being recorded to determine total ration consumption for each lot. The animals were weighed initially and at four-week intervals, and performance was evaluated over a ninety day experimental period. Weigh periods were at the end of 28 days, 56 days, 84 days and 90 days.

The liquid supplement used in this test was prepared in a jet cooker in the manner described above, with a cooking temperature of about 285° F. and addition of molasses and acids subsequent to cooking. The particular constituents used in this supplement are set forth in Table VII:

TABLE VII

| Constituent | % by Weight | Crude Protein | [1]TDN |
|---|---|---|---|
| Corn | 18.12 | 1.63 | 14.50 |
| Urea | 9.90 | 27.82 | — |
| Molasses | 12.94 | 0.39 | 8.80 |
| Phosphoric Acid | 1.00 | — | — |
| Propionic Acid | 0.50 | — | 0.80 |
| Water | 57.54 | — | — |
| TOTALS | 100.00 | 29.84 | 24.10 |

[1]Total Digestible Nutrients derivable from the constituents and overall liquid supplement.

and fed in an unprocessed condition on the feed silage. It is significant in this respect that the total TDN value for the molasses-urea supplement amounted to 46.24.

TABLE VIII

| Constituent | % by Weight | Crude Protein | TDN |
|---|---|---|---|
| Molasses | 68.0 | 2.04 | 46.24 |
| Urea | 10.0 | 28.10 | — |
| Phosphoric Acid | 3.0 | — | — |
| Water | 19.0 | — | — |
| TOTALS | 100.0 | 30.14 | 46.24 |

The chunk-type starch-NPN feed fed during this test was a commercially available feed sold by Far-Mar-Co, Inc., of Hutchinson, Kansas, and had a TDN value of 79.5. This product is a sorghum-based extruded feed processed in accordance with U.S. Pat. No. 3,642,489, and had a P.E. of about 44. The soybean meal supplement fed in this test was purchased commercially and had a TDN value of 78.0.

The respective test groups of cattle were fed measured amounts of silage, sorghum and the particular feed supplement in order to substantially equalize the daily rations on a nitrogen and energy basis. However, by virtue of the fact that prairie hay was of necessity fed on a free choice basis, some slight differences existed in the average daily TDN values consumed by each group of animals. The average daily ration for each group of test animals is set forth in Table IX below, along with the average daily TDN value for each group. It should be noted in this respect that the TDN value for both the soybean meal supplement group and the chunk produ group significantly exceeds that of the liquid supplement group, while the molasses-urea group is slightly higher than the liquid supplement group.

TABLE IX

| [1]Group | Average Daily Amount Consumed (lbs.) | | | | | | | |
|---|---|---|---|---|---|---|---|---|
| | Silage | [2]Prairie Hay | Sorghum | Soybean Meal | Starch-NPN Chunk Product | Liquid Supplement | Urea-Molasses | TDN |
| SBM | 5.00 | 9.91 | 0.60 | 0.90 | — | — | — | 6.61 |
| Chunk Starch-NPN Product | 5.00 | 9.74 | 0.60 | — | 0.90 | — | — | 6.54 |
| Liquid Supplement | 6.70 | 9.63 | — | — | — | 1.60 | — | 6.06 |
| Molasses- | | | | | | | | |

TABLE IX-continued

| | Average Daily Amount Consumed (lbs.) | | | | | | |
|---|---|---|---|---|---|---|---|
| ¹Group | Silage | ²Prairie Hay | Sorghum | Soybean Meal | Starch-NPN Chunk Product | Liquid Supplement | Urea-Molasses | TDN |
| Urea | 5.00 | 9.85 | — | — | — | — | 1.50 | 6.13 |

¹Each group consisted of two lots of six animals each, and the consumption figures are the average amount consumed by each animal in the respective groups.
²Fed on a free choice basis to all animals, which were also supplied free choice with a conventional vitamin and mineral supplement.

The results of this test procedure are set forth in Table X, and conclusively demonstrate the efficacy of the present liquid supplements as opposed to those conventionally available. In this connection, it is especially noteworthy that the best overall average weight gain was recorded through the use of the liquid supplement of this invention, notwithstanding the fact that the average TDN of this total ration was in all cases lower than the average TDN values of the comparative rations. Of course, lesser TDN values would lead to the prediction that the growth results using the liquid supplement would likewise be less than the other supplements. Therefore, it was quite unexpected to discover that in this test the liquid supplement synergistically enhanced growth rates as compared with the conventional supplements.

In the conversion of an NPN substance such as urea to microbial protein, it is known that the presence of starch enhances the conversion to a greater extent than does cellulose or sugars, and that cooked starch is more satisfactory than raw starch. Therefore, it can readily be explained why the chunk starch-NPN extruded product and the liquid supplement of the present invention were superior to the liquid molasses-urea supplement. However, the liquid supplement of the invention contained less cooked starch material than the chunk product and yet outperformed the latter. Although the reason for this result is not fully understood, it is hypothesized that processing of starch and an NPN source in the manner of the present invention (e.g., in a jet cooker with direct turbulent steam) produces a fundamentally different starch-NPN product than that produced by conventional extrusion methods of the type described in U.S. Pat. No. 3,642,489. It is theorized that the liquid product hereof may be metabolized differently by rumen bacteria than the product formed from extrusion cooking. Moreover, starch changes induced by the different cooking procedures may yield different types of degraded starch with the liquid form being more readily used by rumen microorganisms than the extrusion processed form, since it is known that rumen microorganisms use different sugars and starches with different efficiencies in synthesizing microbial protein from an NPN source. Finally, it may be that the liquid product is more uniformly distributed in the rumen and that this factor serves to enhance utilization thereof.

Of course, it is not intended that the scope of the present invention be limited in any way to specific operational theories or explanations; therefore, the foregoing hypotheses should be construed merely as the best explanations available at present to account for the growth-inducing activity of the liquid supplements of the invention.

TABLE X

GROWTH RESULTS

| Group | Avg Initial Wt (lbs) | Avg Final Wt (lbs) | Avg Gain (lbs) (90 days) | Lbs Ration / Lbs Gain | Average Gains Per Weigh Period (lbs) | | |
|---|---|---|---|---|---|---|---|
| | | | | | 0–28 Days | 0–84 Days | 0–90 Days |
| SBM | 479.00 | 531.33 | 52.3 | 20.66 | 44.2 | 52.4 | 52.3 |
| Chunk Starch-NPN Product | 481.58 | 514.33 | 32.8 | 32.63 | 21.4 | 36.3 | 32.7 |
| Liquid Supplement | 458.58 | 515.50 | 56.9 | 18.26 | 32.0 | 52.1 | 56.9 |
| Molasses-Urea | 477.08 | 504.50 | 27.4 | 37.94 | 13.0 | 17.6 | 27.4 |

EXAMPLE IV

The objective of this experiment was to determine the protein synthesis effect of processing conditions on identical starch-urea mixtures. The constituents of the four formulae tested, along with the respective protein synthesis results, are set forth in Table XI.

Formula I was a liquid starch-NPN supplement in accordance with the invention which was jet cooked in the manner described above in connection with the supplement of Table VII at a cooking temperature of about 285° F. Formulae II and III employed a sorghum-based chunk-type starch-NPN extrusion-processed product sold by Far-Mar-Co., Inc., of Hutchinson, Kansas, having a P.E. of about 70. In the case of Formula II, sufficient chunk product was utilized to give the overall mixture the equivalent of 9.90% urea, the amount used in Formula I. Formula III, on the other hand, contained sufficient chunk product to yield an equivalent of 18.12% processed grain (the same as in Formula I), with extra urea being added to make the total urea content of Formula III 9.90% by weight. The chunk-type product employed in Formulae II and III was pulverized to an average particle size of about 100 microns prior to the addition of water so that the final supplements made therefrom were in the form of a slurry.

Formula IV was simply an admixture of raw, pulverized corn, urea and the remaining constituents in an amount equaling that used in Formula I. This formula was not subjected to any cooking whatsoever.

The above supplements were then tested for in vitro protein synthesis. In particular, one-gram samples of each supplement were weighed and placed in an incubator tube along with 20 milliliters of buffer and 10 milliliters of strained rumen fluid. The incubator tubes were fitted with stoppers containing Bunsen valves.

The tubes were incubated at 39° C. for four hours. At the end of four hours, the samples were centrifuged and the residue remaining after centrifugation was washed with methyl alcohol. Analysis was conducted on the residue from the methyl alcohol wash, on the original feed sample, and on the rumen fluid. Corrections were made to account for the protein present in the rumen fluid and in the supplements. The remaining protein was recorded as protein synthesis. Duplicate samples were run using each formula. The averaged protein synthesis results tabulated indicate that the greatest protein synthesis occurs with the liquid supplement of the present invention, while the least synthesis obtains with the raw admixture. The two formulae containing extrusion-processed, pulverized starch-NPN material give values intermediate to the raw and hydrothermally jet-cooked product of the invention. Thus, it is clear that processing in accordance with the invention materially affects the protein derivable from the starch-NPN compositions.

tared 15-milliliter beakers for determination of total dry matter remaining.

Substrate blanks and a rumen fluid blank were prepared. Subtracting the blanks' values from the methanol-washed fermentation centrifugates gave an estimate of the protein synthesis that occurred during fermentation. A blank for each substrate was prepared as previously except that each blank was incubated in 30 milliliters of mineral buffer for 4 hours at 39° C. The rumen fluid blank was prepared as explained by direct high speed centrifugation and methanol-extraction of rumen fluid immediately after it was collected.

A second experiment was conducted wherein the substrate consisted of a basal ration consisting of 78.75% prairie hay, 19.75% sorghum grain, 0.6% salt, 0.6% dicalcium phosphate, 0.05% vitamin supplement, and 0.025% molasses. To each 7.5 parts of basal ration was added one part of either the liquid supplement of the invention or the unprocessed molasses-urea supplement. One-gram quantities of the basal ration plus

TABLE XI

| Formula | [1]Raw Corn | Processed Corn | Chunk Starch-NPN Product | Urea | Molasses | Phosphoric Acid | Propionic Acid | Water | [4]Protein Synthesis |
|---|---|---|---|---|---|---|---|---|---|
| I | — | 18.12 | — | 9.90 | 12.94 | 1.00 | 0.50 | 57.54 | 100.0 |
| [2]II | — | — | 48.29 | — | 12.94 | 1.00 | 0.50 | 37.27 | 69.6 |
| [3]III | — | — | 22.79 | 5.228 | 12.94 | 1.00 | 0.50 | 57.542 | 82.3 |
| IV | 18.12 | — | — | 9.90 | 12.94 | 1.00 | 0.50 | 57.54 | 66.3 |

[1]All formula figures given in parts by weight.
[2]The chunk-type starch-NPN food source used in Formula II was used in an amount to give the overall formula the equivalent of 9.90 % urea.
[3]The amount of starch-NPN food source used in Formula III was sufficient to give the overall formula the equivalent of 18.12 % cooked grain.
[4]Protein synthesis figures for Formulas II–IV are given as a percent of the protein synthesis value of Formula I.

EXAMPLE V

The purpose of this Example was to compare the in vitro microbial protein synthesis of the liquid supplements of the present invention and processed and unprocessed molasses-urea supplements. In particular, the liquid supplement was identical in all respects to Formula I of Example IV, while the molasses-urea supplement contained constituents identical with the molasses-urea composition specified in Table VIII. Both the liquid supplement hereof and the processed molasses-urea mixtures were cooked in a jet cooker of the type depicted in FIG. 2 and at a temperature of about 285° F.

In the experimental procedure, rumen fluid was obtained before the morning feeding from a rumen-fistulated cow receiving twice daily 4 pounds grain mixture and 4 pounds alfalfa hay. The rumen fluid was strained through four layers of cheese cloth immediately. One gram of the liquid supplement of the invention, one gram of unprocessed molasses-urea supplement, and 1 gram of processed molasses-urea supplement were weighed into 50 milliliter plastic centrifuge tubes. Ten milliliters of rumen fluid inoculum and 20 milliliters of mineral buffer were added to each tube. The tubes were incubated for 4 hours at 39° C. After their contents were fermented, the tubes were centrifuged for 15 minutes. The supernatants were discarded, and the centrifugates were resuspended in 25 milliliters of methanol and centrifuged for 15 minutes. The supernatants were again discarded, and the centrifugates were resuspended in methanol and centrifuged as before. The supernatants were again discarded and centrifugates from each substrate were transferred to Kjeldahl flasks for macro-Kjeldahl nitrogen analysis, and to liquid supplement or basal ration plus unprocessed molasses-urea supplement were incubated with rumen fluid using the procedure described above.

The quantity of microbial protein synthesized from each of the substrates is shown in Table XII. It is readily apparent that a much greater quantity of microbial protein was synthesized from the liquid supplement hereof than from the unprocessed molasses-urea mixture. In addition, hydrothermal processing of the molasses-urea supplement in a jet cooker at 285° F. did not increase (but rather decreased) microbial protein synthesis.

A study of the results of Table XII make it clear that the liquid supplements of the present invention provide a better source of energy and have enhanced protein synthesis properties as compared with processed or unprocessed mixtures consisting simply of molasses and urea.

TABLE XII

| Substrate | Quantity (g) | Microbial Protein (mg/100 ml) |
|---|---|---|
| Liquid Supplement | 1.0 | 96.7 |
| Unprocessed Molasses-Urea | 1.0 | 48.6 |
| Processed Molasses-Urea | 1.0 | 30.4 |
| Processed Molasses-Urea | [1]1.3 | 35.7 |
| Basal Ration + Liquid Supplement | 1.0 | 38.6 |
| Basal Ration + Molasses-Urea | 1.0 | 26.2 |

[1]Since the processed molasses-supplement contained less nitrogen, the substrate level was increased from 1 g to 1.3 g to make it isonitrogenous with the liquid supplement and unprocessed molasses-urea supplements.

EXAMPLE VI

The purpose of this Example was to demonstrate the use of the liquid supplements of the present invention as feed supplements for milk-producing dairy cattle and to compare the relative value of the supplements hereof with typical molasses-urea commercial type liquid supplements.

Two balanced groups of cows were used in a double reversal experimental design, with sixteen cows in Group I and seventeen cows in Group II. During a preliminary period, both groups of cows were fed alfalfa hay and standard herd ration containing 14% protein. Both the hay and herd ration were fed ad libitum. In balancing the two groups the milk production recorded for the last five days of the preliminary period was averaged. Following the preliminary period, both groups were fed a low-protein grass hay (prairie hay). The hay was fed ad libitum and the amount consumed by each group was recorded daily. The grain ration was also fed ad libitum and the amount fed recorded daily. The grain ration contained 11% protein on an as-fed basis. The formula of the grain ration was as follows: Sorghum grain, 87.3%; wheat midlings, 5%; soybean meal, 5%; calcium phosphorus supplement, 1.0%; limestone, 1.0%; trace mineralized salt, 0.5%; and A and D vitamin supplement, 0.2%.

The liquid supplement used had the same constituents and was prepared exactly as described in Example IV and the molasses-urea supplement identical with that described in Table VIII above. The respective supplements were poured over the grain ration for each cow. The supplements were fed at the rate of 2.5 pounds per cow per feeding (5 pounds per day).

The effects of the liquid supplement of the present invention and the conventional molasses-urea supplement on milk production are tabulated in Table XIII. During the first three weeks of period 1, the average daily milk production was similar for the two supplement treatments. However, during weeks 4 and 5, the decline in milk production was greater for the molasses-urea supplement than for the supplement of the present invention. During the first 3 weeks of period 2, the decline in milk production for both groups was again similar. However, during weeks 4 and 5 of period 2, the decline in milk production was considerably greater for the molasses-urea supplement fed cows than those fed the supplement of the invention. This pattern was again repeated during period 3 with a lesser decline for the liquid supplement fed group during weeks 4 and 5.

The above pattern is significant since each time the rations were switched in Period 1, 2 and 3 the group receiving the liquid supplement ration declined less in milk production than the group receiving the molasses-urea supplement. This clearly demonstrates that the effect was not a group effect but was due to the supplement of this invention.

It is to be understood that all cows decline in milk production with time due to the effect of advancing lactation. The decline of 5% to 6% during the first three weeks in periods 1 and 2 is similar to the normal decline expected due to advancing lactation. (The increase in production during the first three weeks of period 3 is ascribed to cool weather that was experienced during this summer period. Hot weather is known to depress milk production.) However, in periods 1, 2 and 3 the decline for the molasses-urea supplement was, respectively, 45%, 37%, and 63% greater than the decline for the supplement of the present invention. This would suggest that the molasses-urea supplement was unable to supply sufficient protein for milk production and that this need was better met by the liquid supplement. It is also apparent that it took approximately three weeks for the protein deficiency in the molasses-urea fed supplement cows to appear. Thus, it is clear that the supplement of the present invention is superior as a protein source to molasses-urea mixtures for lactating dairy cows fed low quality roughage.

TABLE XIII

| Period | Group | No. of Cows | Treatment | Average Daily Milk Production Weeks 1-3 (lbs) | Average Daily Milk Production Weeks 4-5 (lbs) | Change In Milk Production From Previous Period Weeks 1-3 (%) | Change In Milk Production From Previous Period Weeks 4-5 (%) |
|---|---|---|---|---|---|---|---|
| Preliminary | I | 16 | Control | 51.6 | — | — | — |
|  | II | 17 | Control | 51.6 | — | — | — |
| 1 | I | 16 | Liquid Supplement | 48.3 | 48.4 | − 6.4 | − 6.2 |
|  | II | 17 | Molasses-Urea | 48.3 | 45.8 | − 6.2 | −11.2 |
| 2 | I | 16 | Molasses-Urea | 46.1 | 42.9 | − 4.7 | −11.4 |
|  | II | 17 | Liquid Supplement | 43.4 | 42.5 | − 5.2 | − 7.2 |
| 3 | I | 16 | Liquid Supplement | 44.5 | 43.4 | + 3.7 | − 2.5 |
|  | II | 17 | Molasses-Urea | 43.5 | 40.5 | + 2.4 | − 6.7 |

EXAMPLE VII

A series of toxicity tests were undertaken with the liquid supplement of the present invention in order to confirm that they can be safely fed to ruminants.

The test supplement consisted of 18.12% pulverized corn (about 100 microns average particle size), 9.90% urea, 12.94% molasses, 2.91% phosphoric acid and 56.13% water. The feed constituents were hydrothermally cooked with direct steam in a jet cooker at a temperature of about 285° F. in the manner fully described above in connection with the supplement of Table VII.

The liquid feed supplement was fed at a rate to provide 50 grams of urea for each 100 kilograms of body weight. The material was introduced directly into the rumen of the test cattle by means of a rumen fistula. Rumen pH and ammonia levels, along with blood ammonia levels, were measured periodically in order to determine whether the feed supplement was toxic. In each of the six test cattle no symptoms of toxicity were observed. These test results are set forth in Table XIV.

TABLE XIV

| Cow No. | Cow Wt (Kg) | Liquid Supplement Introduced (g) | Time (min) | Rumen PH | Rumen NH₃—N/ 100 ml | Blood NH₃—N/ 100 ml |
|---|---|---|---|---|---|---|
| 1 | 267 | 1,348 | 0 | 6.80 | 2.71 mg | 0.125 mg |
| | | | 30 | 7.10 | 28.24 | 0.482 |
| | | | 60 | 7.25 | 75.17 | 0.820 |
| | | | 90 | 7.30 | 81.94 | 0.632 |
| | | | 120 | 7.15 | 92.78 | 0.776 |
| | | | 180 | 7.00 | 81.94 | 0.764 |
| | | | 240 | 6.85 | 67.72 | 0.582 |
| 2 | 276 | 1,393 | 0 | 7.05 | 2.71 | 0.113 |
| | | | 30 | 7.00 | 29.80 | 0.419 |
| | | | 60 | 7.15 | 45.37 | 0.382 |
| | | | 90 | 7.25 | 60.27 | 0.714 |
| | | | 120 | 7.28 | 65.01 | 0.801 |
| | | | 180 | 7.10 | 59.59 | 0.883 |
| | | | 240 | 7.10 | 56.88 | 0.782 |
| 3 | 363 | 1,833 | 0 | 6.95 | 10.89 | 0.094 |
| | | | 30 | 6.10 | 35.21 | 0.307 |
| | | | 60 | 6.65 | 48.08 | 0.507 |
| | | | 90 | 6.90 | 56.88 | 0.513 |
| | | | 120 | 7.10 | 67.04 | 0.795 |
| | | | 180 | 7.25 | 69.07 | 0.814 |
| | | | 240 | 7.25 | 69.07 | 0.770 |
| 4 | 366 | 1,848 | 0 | 7.10 | 9.48 | 0.069 |
| | | | 30 | 7.15 | 30.47 | 0.269 |
| | | | 60 | 7.50 | 44.02 | 0.532 |
| | | | 90 | 7.40 | 56.88 | 0.551 |
| | | | 120 | 7.45 | 63.66 | 0.826 |
| | | | 180 | 7.45 | 56.88 | 0.638 |
| | | | 240 | 7.40 | 46.08 | 0.507 |
| 5 | 264 | 1,333 | 0 | 7.1 | 6.09 | 0.044 |
| | | | 30 | 7.05 | 40.63 | 0.263 |
| | | | 60 | 7.10 | 56.88 | 0.394 |
| | | | 90 | 7.20 | 62.30 | 0.451 |
| | | | 120 | 7.20 | 58.92 | 0.444 |
| | | | 180 | 7.15 | 58.24 | 0.519 |
| | | | 240 | 7.10 | 48.08 | 0.378 |
| 6 | 265 | 1,338 | 0 | 7.50 | 2.03 | 0.038 |
| | | | 30 | 7.10 | 29.12 | 0.150 |
| | | | 60 | 7.25 | 46.73 | 0.200 |
| | | | 90 | 7.25 | 55.53 | 0.382 |
| | | | 120 | 7.40 | 62.98 | 0.507 |
| | | | 180 | 7.40 | 85.33 | 0.695 |
| | | | 240 | 7.35 | 62.98 | 0.620 |

EXAMPLE VIII

In this Example, potato and milo starch sources were used to make liquid supplements, and the protein synthesis effectiveness thereof was measured against a corn-based liquid supplement in accordance with the invention.

The potato starch used in this test was obtained from a waste stream from the production of potato chips and had the composition of a fine paste. On an as-is basis, the waste stream material contained 0.23% crude protein, 55% moisture and 0.05% ash. The corn and milo in the comparative runs were micropulverized to an average particle size of about 100 microns. In each case the six formulae were processed in a jet cooker of the type described above at a temperature of about 285° F. The constituents of each of the test runs, along with the protein synthesis results, are set forth in Table XV.

As can be seen from a study of Table XV, use of potato starch permits production of liquid supplements having relatively high dry matter contents which in general exceed those possible with corn or other grain sources. Furthermore, it is significant that the protein synthesis data indicates that the derivable microbial protein from potato and milo at least substantially equals and in many cases exceeds that obtainable from corn.

TABLE XV

| Formula | Starch | Starch Amount | Urea (%) | Starch/ Urea | Molasses (%) | Phosphoric Acid (%) | H₂O (%) | Propionic Acid (%) | [3]D.M. Before Cook | [3]D.M. After Cook | [5]Protein Synthesis |
|---|---|---|---|---|---|---|---|---|---|---|---|
| 1 | Potato | [1]35.83 | 11.00 | 1.5:1 | 38.5 | 2.00 | 12.17 | 0.50 | 59.2 | 52.4 | 133 |
| | | | | | | | | | | | 107 |
| 2 | Potato | 35.83 | 11.00 | 1.5:1 | 38.5 | 2.00 | 12.17 | 0.50 | 59.2 | 53.3 | 132 |
| 3 | Potato | 41.88 | 11.04 | 1.75:1 | 31.04 | 2.00 | 13.54 | 0.50 | 57.0 | 49.3 | 103 |
| | | | | | | | | | | | 94 |
| 4 | Potato | 41.88 | 11.04 | 1.75:1 | 31.04 | 2.00 | 13.54 | 0.50 | 57.0 | 49.6 | 97 |
| 5 | Corn | [2]18.12 | 9.90 | 2:1 | 12.94 | 1.00 | [4]57.54 | 0.50 | 40.0 | 34.1 | 100 |

TABLE XV-continued

| Formula | Starch | Starch Amount | Urea (%) | Starch/ Urea | Molasses (%) | Phosphoric Acid (%) | H₂O (%) | Propionic Acid (%) | ³D.M. Before Cook | ³D.M. After Cook | ⁵Protein Synthesis |
|---------|--------|---------------|----------|--------------|--------------|--------------------|---------|--------------------|-------------------|------------------|--------------------|
| 6 | Milo | ²18.12 | 9.90 | 2:1 | 12.94 | 1.00 | ⁴57.54 | 0.50 | 40.0 | 34.3 | 109, 143, 91 |

¹Waste stream from production of potato chips containing 45 % moisture.
²Grain was micropulverized to an average size of about 100 microns.
³Dry matter.
⁴In Formulae 5 and 6, the moisture figure represents that added initially to form a slurry, while in Formulae 1–4 the absorbed water is that amount taken up in processing.
⁵Three replicates of 1.5:1 potato base, 1.75:1 potato base, and milo base liquid supplements taken on different days and given as a percent of the corn base control as 100.

Having thus described the invention, what is claimed as new and desired to be secured by Letters Patent is:

1. A method of preparing a highly nutritious liquid starch-NPN ruminant feed supplement comprising the steps of:
   preparing an aqueous slurry comprising water and a solids fraction including a quantity of an edible, substantially ungelatinized starch-bearing feed material and an amount of a nonprotein nitrogenous substance characterized by the property of being hydrolyzable to ammonia by rumen microorganisms which is thereafter convertible to microbial protein;
   continuously directing a stream of said slurry through a cooking area presenting a zone of turbulence while simultaneously and continuously directing a stream of steam through said zone for directly and turbulently heating, disrupting and gelatinizing under pressures above atmospheric at least a fraction of the starchbearing food source in said slurry stream while the food source is in intimate contacting relationship with the nonprotein nitrogenous substance present in the slurry stream, to thereby yield a reacted feed supplement product; and
   continuously passing said feed product out of said cooking area.

2. The method of claim 1 wherein said slurry comprises from about 30% to 90% by weight free water, and correspondingly a solids fraction of from about 10% to 70% by weight.

3. The method of claim 2 wherein said slurry comprises from about 40% to 70% by weight free water, and correspondingly a solids fraction of from about 30% to 60% by weight.

4. The method of claim 1 wherein the ratio of starch-bearing food source to nitrogen from said nonprotein nitrogenous substance ranges from about 4:0.45 to 1:1.80.

5. The method of claim 4 wherein said ratio ranges from about 2:0.45 to 1:0.90.

6. The method of claim 1 wherein said starch-bearing food source is selected from the group consisting of corn, sorghum, barley, oats, wheat, rice, millet, hay, silage, potatoes, yams, cassava, arrowroot, turnips, rutabagas, corn starch, potato starch, wheat starch, starch-bearing food and beer making waste liquors, and mixtures thereof.

7. The method of claim 1 wherein said nonprotein nitrogenous substance is selected from the group consisting of urea, uric acid, biuret, ethylene urea, ammonia, ammonium salts, propionamide, butyramide, formamide, acetamide, dicyanodiamide, isobutane diurea, creatinine, and creatine and mixtures thereof.

8. The method of claim 7 wherein said ammonium salts are selected from the group consisting of ammonium phosphate, ammonium carbonate, ammonium bicarbonate, ammonium carbamate, ammonium citrate, ammonium formate, ammonium acetate, ammonium propionate, ammonium lactate, ammonium succinate, ammonium fumarate, ammonium malate, ammonium chloride, ammonium sulfate, diammonium phosphate and mixtures thereof.

9. The method of claim 7 wherein said nonprotein nitrogenous substance is urea.

10. The method of claim 1 wherein said starch-bearing feed material is a grain ground to an average size of less than about 500 microns.

11. The method of claim 10 wherein said starch-bearing feed material is ground to an average size of from about 75 to 100 microns.

12. The method of claim 1 wherein the temperature within said zone is maintained at a level of from about 215° F. to 388° F.

13. The method of claim 12 wherein said temperature is from about 285° F. to 315° F.

14. The method of claim 1 wherein said starch-bearing food source is from about 50% to 100% gelatinized during passage thereof through said cooking area.

15. The method of claim 14 wherein said starch-bearing food source is from about 90% to 100% gelatinized during passage thereof through said cooking area.

16. The method of claim 1 wherein a pressure of from about 1 to 200 p.s.i.g. is maintained in said zone.

17. The method of claim 16 wherein said pressure ranges from about 38 to 70 p.s.i.g.

18. The method of claim 1 wherein said feed product has a protein equivalent of from about 15% to 150%.

19. The method of claim 18 wherein said protein equivalent is from about 30% to 70%.

20. The method of claim 1 wherein said slurry and steam streams are directed for intersecting contact within said zone of turbulence.

21. The method of claim 20 wherein said steam stream is directed in one direction through said zone of turbulence, and said slurry stream is directed obliquely but in the same general direction as said steam stream in said zone for direct intersecting contact and intermingling of the respective streams.

22. The method of claim 1, including the step of altering the viscosity of said feed product so that the latter has a viscosity within the range of from about 100 to 20,000 cps.

23. The method of claim 22, wherein is included the steps of:
   adding molasses to the feed product after emergence thereof from said cooking area and directing the mixture to a holding zone and cooling the product therein to a temperature under about 185° F;
   adding an amount of an amylase enzyme to said mixture within the holding zone for lowering the viscosity thereof; and adding an amount of acid to said mixture after the latter is of a desired viscosity for stopping the action of said added enzyme.

24. The method of claim 1, wherein said feed product comprises from 40% to 96% by weight water.

25. The method of claim 24, wherein said feed product comprises from about 40% to 70% by weight water.

26. The method of claim 1 wherein a quantity of a food source selected from the group consisting of molasses, hemicellulose extract of wood, lignin sulfonates, beermaking waste liquors, cheese whey and mixtures thereof is admixed with feed product.

27. The method of claim 1, wherein is included the step of adding acid to said feed product taken from the group consisting of sulfuric, hydrochloric, phosphoric, propionic, acetic, sorbic, benzoic, butyric and formic acids and mixtures thereof.

28. A highly nutritious liquid starch-NPN ruminant feed supplement comprising:
from about 40% to 96% by weight water;
a solids fraction comprising the balance of said supplement and in substantially homogeneous suspension in said water,
said solids fraction comprising respective quantities of an edible starch-bearing feed material and a nonprotein nitrogeneous substance which have been simultaneously treated as an aqueous slurry with direct steam under pressures above atmospheric for turbulently heating, disrupting and gelatinizing the starch-bearing feed material in the presence of said substance,
said substance being characterized by the property of being hydrolyzable to ammonia by rumen microorganisms which is thereafter convertible to microbial protein.

29. The supplement as set forth in claim 28 wherein water comprises from about 40% to 70% by weight thereof.

30. The supplement as set forth in claim 28 wherein the ratio of starch-bearing food source to nitrogen from said nonprotein nitrogeneous substance ranges from about 4:0.45 to 1:1.80.

31. The supplement as set forth in claim 30 wherein said ratio ranges from about 2:0.45 to 1:0.90.

32. The supplement as set forth in claim 28 wherein said starch-bearing food source is selected from the group consisting of corn, sorghum, barley, oats, wheat, rice, millet, hay, silage, potatoes, yams, cassava, arrowroot, turnips, rutabagas, corn starch, potato starch, wheat starch, starch-bearing food and beer making waste liquors and mixtures thereof.

33. The supplement as set forth in claim 28 wherein said nonprotein nitrogeneous substance is selected from the group consisting of urea, uric acid, biuret, ethylene urea, ammonia, ammonium salts, propionamide, butyramide, formamide, acetamide, dicyanodiamide, isobutanediurea, creatinine, and creatine and mixtures thereof.

34. The supplement as set forth in claim 33 wherein said ammonium salts are selected from the group consisting of ammonium phosphate, ammonium carbonate, ammonium bicarbonate, ammonium carbamate, ammonium citrate, ammonium formate, ammonium acetate, ammonium propionate, ammonium lactate, ammonium succinate, ammonium fumarate, ammonium malate, ammonium chloride, ammonium sulfate, diammonium phosphate and mixtures thereof.

35. The supplement as set forth in claim 33 wherein said nonprotein nitrogeneous substance is urea.

36. The supplement as set forth in claim 28 wherein said starch-bearing feed material is a grain ground to an average size of less than about 500 microns.

37. The supplement as set forth in claim 36 wherein said starch-bearing feed material is ground to an average size of from about 75 to 100 microns.

38. The supplement as set forth in claim 28 wherein said starch-bearing feed material is from about 50% to 100% gelatinized.

39. The supplement as set forth in claim 38 wherein said starch-bearing material is from about 90% to 100% gelatinized.

40. The supplement as set forth in claim 28 wherein said feed product has a protein equivalent of from about 15% to 150%.

41. The supplement as set forth in claim 40 wherein said protein equivalent is from about 30% to 70%.

42. The supplement as set forth in claim 28 wherein said feed supplement has a viscosity within the range of from about 100 to 20,000 cps.

43. The supplement as set forth in claim 28 wherein said feed supplement also includes a quantity of molasses uniformly admixed with said water and solids fraction.

44. The supplement as set forth in claim 28 including a food source admixed therewith and selected from the group consisting of molasses, hemicellulose extract of wood, lignin sulfonates, beer-making waste liquors, cheese whey and mixtures thereof.

45. The supplement as set forth in claim 28 including an acid selected from the group consisting of sulfuric, hydrochloric, phosphoric, propionic, acetic, sorbic, benzoic, butyric and formic acids and mixtures thereof.

* * * * *